United States Patent Office 2,965,562
Patented Dec. 20, 1960

2,965,562

HYDROCRACKING HYDROCARBON OILS WITH A CATALYST COMPOSITE, COMPRISING CHROMIUM SESQUIOXIDE AND REDUCED CUPRIC OXIDE

Lloyd E. Gardner, Bartlesville, Okla., assignor to Phillips Petroleum Company, a corporation of Delaware No Drawing. Filed Dec. 9, 1957, Ser. No. 701,356

5 Claims. (Cl. 208—112)

This invention relates to an improved hydrocarbon conversion catalyst. In one specific aspect, the invention is concerned with a novel chromium oxide-copper oxide catalyst. In another aspect, the invention relates to a method of hydrocracking heavy oils.

In the hydrocracking of heavy oils, the main objective is to obtain a good conversion of the heavy oils to lower boiling materials while obtaining as low as possible laydown of coke on the catalyst. As will be understood by those skilled in the art, the faster that coke is laid down on the catalyst, the more often the conversion cycle must be interrupted for regeneration of the catalyst in order to remove the coke.

It is an object of the invention to provide an improved catalyst. It is also an object of the invention to provide an improved process for hydrocracking a heavy oil. Another object is to provide an improved hydrocracking catalyst which has high cracking activity with low conversion to coke. Other objects, as well as aspects and advantages of the invention, will become apparent from a consideration of the accompanying disclosure.

The improved catalyst of my invention is the product resulting from the reduction in a reducing atmosphere of a mixture comprising 1 to 5 parts by weight of chromium sesquioxide ($Cr_2O_3$) with 99 to 95 parts by weight of cupric oxide, the reduction being effected until at least 50 weight percent of the cupric oxide is reduced to metallic copper. The catalyst of the invention has an excellent balance of properties when employed in the hydrocracking of heavy oils, giving both excellent conversions to more valuable lower boiling hydrocarbons and low coke laydown.

The catalyst is suitably employed without any extraneous supporting material. However, suitable inactive supports can be employed, if desired, such as alpha-alumina, glass beads, etc.

The catalyst of the invention is particularly useful for hydrocracking hydrocarbon oils boiling above 700° F., especially those boiling above 850° F., although lower boiling hydrocarbons can be present in the hydrocracking process and frequently are. Usually the hydrocarbon fraction treated does not contain materials boiling lower than 400° F. Hydrocracking is the destructive hydrogenation of heavy oils in the presence of hydrogen, as is understood in the art. The heavy oils are commonly obtained in refineries as residuum, topped crudes, and the like. The oils usually contain sulfur, although the process is applicable to feeds containing no sulfur. Sulfur concentrations usually do not exceed about 4 weight percent, although higher sulfur feeds are applicable. Also, crude petroleum, tars, and other heavy fractions of petroleum can be hydrocracked according to the process of this invention employing the novel catalyst. The range of operating conditions for hydrocracking with this catalyst employing such heavy oil feeds are:

|  | Broad | Preferred |
|---|---|---|
| Temperature, °F | 750-900 | 800-850 |
| Pressure, p.s.i.g. | 500-5,000 | 1,000-2,000 |
| LHSV [1] | 0.25-5 | 1-2 |
| $H_2$, cubic feet/bbl. oil | 500-10,000 | 2,000-5,000 |

[1] Liquid hourly space velocity.

For best results conversion of the material boiling above 700° F. is usually a maximum of 80 weight percent.

When employing a sulfur containing feed during the course of the reaction a portion of the copper present is probably converted to the sulfide.

A particularly useful method for preparing the catalyst of the invention is to impregnate pills of cupric oxide gel by soaking the pills in a chromium salt solution, such as chromium nitrate, $Cr(NO_3)_3$, drying the pills say at 110 to 250° F., and then calcining them at an elevated temperature from about 900 to about 1100° F., for instance, and thereby converting the chromium salt to chromium sesquioxide. The catalyst is then reduced in a reducing atmosphere (such as $H_2$) by heating at an elevated temperature, say from 500 to 950° F. until at least 50 weight percent reduction of the copper to metallic copper is obtained. The amount of reduction can be measured by recovering and measuring the amount of water produced during the reduction.

The catalyst can also be prepared by making an aqueous solution of cupric nitrate and an aqueous solution of chromium nitrate, $Cr(NO_3)_3$, mixing the solutions and then coprecipitating by adding a base, such as ammonium hydroxide. The solution is filtered, the residue dried, and calcined at about 900 to 1100° F. The catalyst is then reduced in a reducing atmosphere until at least 50 weight percent of the copper is converted to metallic copper.

The following examples show the advantages of the catalyst of the invention.

Fixed beds of various catalysts in pellet form were employed to hydrocrack 400° F.+Wafra crude. Operating conditions were 1000 p.s.i.g., 1 LHSV, 825-850° F., and 2000 cubic feet hydrogen per barrel of oil. The results are shown in Table I. This feed contained 3.6 weight percent sulfur, and 55 weight percent of material boiling above 850° F.

Table I

| Catalyst | Percent Conv. of Material Boiling Over 850° F. | Coke on Catalyst, Wt. Percent of Charge |
|---|---|---|
| 1. reduced $CuO-Cr_2O_3$ | 56 | 0.34 |
| 2. $\delta-Al_2O_3$ | [1] 56 | 1.35 |
| 3. $NiO-WO_3-Al_2O_3$ | 51 | 0.67 |
| 4. $WO_3-Al_2O_3$ | 59 | 0.82 |
| 5. $PtO_2-Al_2O_3$ | 57 | 0.68 |
| 6. $Cr_2O_3$ | 58 | 0.50 |
| 7. $MoO_3-Al_2O_3$ | [1] 58 | 0.52 |
| 8. $CoMoO_4-Al_2O_3$ | 63 | 0.78 |
| 9. $CoMoO_4$ | 53 | 0.60 |
| 10. $ZnO-CuO-Cr_2O_3$ | [1] 56 | 0.75 |

[1] Actual runs not carried out at these conversions, but data was taken from a curve based on actual runs.

Catalyst No. 1 was a reduced cupric oxide-chromium sesquioxide catalyst of the invention. The other catalysts are known hydrocracking catalysts.

Catalyst No. 1 was prepared as follows: 709 grams $Cu(NO_3)_2 \cdot 3H_2O$ was dissolved in 12 liters distilled water (pH 3.4). $Cu(OH)_2$ was precipitated by adding 540 cc. of 29 percent $NH_4OH$. The reaction was allowed to proceed for 56 minutes, and the final solution pH was 6.9. The solution was filtered once, and the residue was dried at 105-240° F. for about 90 hours. The material was then heated to 900° F.+ in 5 hours, and 900° F. was maintained for two additional hours.

The resulting CuO was ball milled and pilled into ⅛" x ⅛" cylindrical pills.

The absorptive capacity of the two pills was determined, and 2.5 weight percent $Cr_2O_3$ was impregnated by soaking the pills in a $Cr(NO_3)_3$ solution at the required concentration. The wet pills were dried at 200-220° F. and then ignited at 1000° F.

The resulting catalyst was reduced in hydrogen at 1 atmosphere pressure for 8 hours at 500–850° F. The amount of water recovered in the downstream trap corresponded to conversion of about 75 percent of the CuO to metallic copper.

The following is the distribution of products obtained in the run using catalyst No. 1 of the invention Yield—wt. percent of charge

| | |
|---|---|
| $C_4$ and lighter | 7.8 |
| $C_5$ to 400° F. gasoline | 10.8 |
| 400–500° F. | 15.0 |
| 500–850° F. | 40.4 |
| 850° F.+ | 25.7 |
| Carbon (on catalyst) | 0.34 |

It will be noted that a good conversion of the material boiling above 850° F. was obtained, and at the same time a very low coke laydown was obtained, considerably better than any of the other catalysts.

I claim:

1. An improved catalyst composition which is the product resulting from the reduction in a reducing atmosphere of a mixture comprising one to five parts by weight of chromium sesquioxide with 99 to 95 parts by weight of cupric oxide, said reduction being effected until at least 50 weight percent of the cupric oxide is reduced to metallic copper.

2. A process for hydrocracking hydrocarbon oils boiling above 700° F., employing the steps of charging a catalyst and said hydrocarbon oil to a contacting zone, contacting said oil with said catalyst at a temperature in the range from 750 to 900° F., a pressure from 500 to 5,000 p.s.i.g., a liquid hourly space velocity of from 0.25 to 5, in the presence of from 500 to 10,000 cubic feet of hydrogen for each barrel of oil charged, the said catalyst being a product resulting from the reduction in a reducing atmosphere of a mixture comprising 1 to 5 parts by weight of chomium sesquioxide with 99 to 95 parts by weight of cupric oxide, the reduction being effected until at least 50 weight percent of the cupric oxide is reduced to metallic copper.

3. A process for hydrocracking hydrocarbon oils boiling above 700° F., employing the steps of charging a catalyst and said hydrocarbon oil to a contacting zone, contacting said oil with said catalyst at a temperature in the range from 800 to 850° F., a pressure from 1,000 to 2,000 p.s.i.g., a liquid hourly space velocity of from 1 to 2, in the presence of from 2,000 to 5,000 cubic feet of hydrogen for each barrel of oil charged, the said catalyst being a product resulting from the reduction in a reducing atmosphere of a mixture comprising 1 to 5 parts by weight of chromium sesquioxide with 99 to 95 parts by weight of cupric oxide, the reduction being effected until at least 50 weight percent of the cupric oxide is reduced to metallic copper.

4. A process of claim 3 wherein said hydrocarbon oil contains sulfur.

5. A catalyst of claim 1 wherein said reducing atmosphere contains hydrogen.

References Cited in the file of this patent

UNITED STATES PATENTS

| | | |
|---|---|---|
| 1,881,927 | Pott et al. | Oct. 11, 1932 |
| 2,066,697 | Seguy | Jan. 5, 1937 |
| 2,741,618 | Young | Apr. 10, 1956 |
| 2,782,243 | Hess et al. | Feb. 19, 1957 |
| 2,825,743 | McLean et al. | Mar. 4, 1958 |